Oct. 30, 1962    F. A. DURAND, JR    3,060,701
COOLING DEVICE
Filed May 16, 1960    2 Sheets-Sheet 1
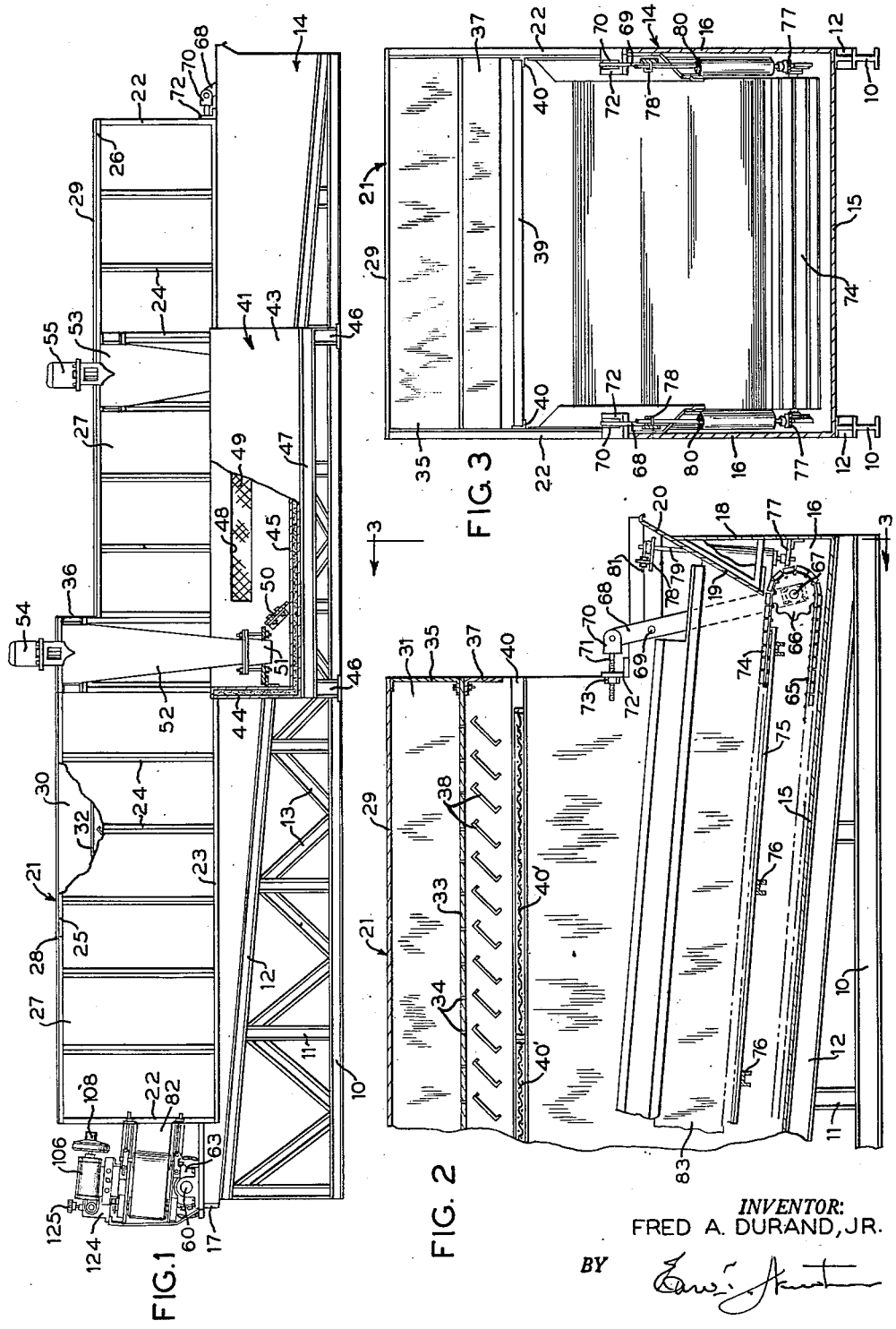
INVENTOR:
FRED A. DURAND, JR.
BY
ATTORNEY Oct. 30, 1962 F. A. DURAND, JR 3,060,701
COOLING DEVICE
Filed May 16, 1960 2 Sheets-Sheet 2
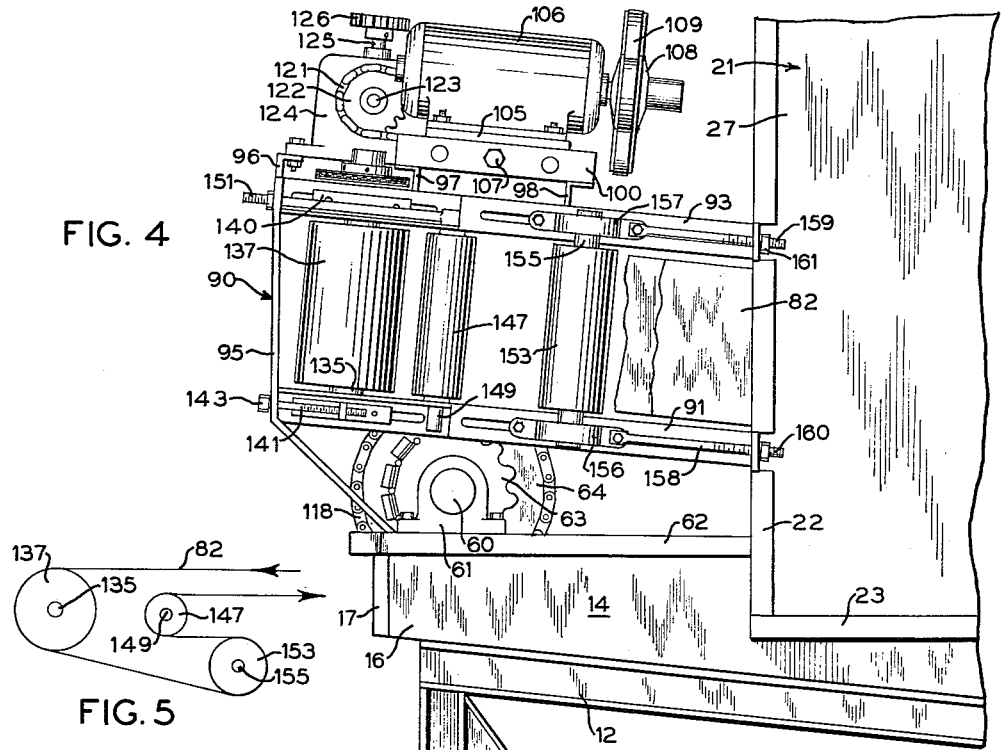
INVENTOR:
FRED A. DURAND, JR
BY
ATTORNEY

United States Patent Office 3,060,701
Patented Oct. 30, 1962

3,060,701
COOLING DEVICE
Fred A. Durand, Jr., Woodbury, Ga.
Filed May 16, 1960, Ser. No. 29,401
9 Claims. (Cl. 62—375)

This invention relates to a cooling device and is more particularly concerned with a device for cooling fruits and vegetables by the circulation of a fluid in intimate contact therewith as the fruits and vegetables are conveyed from one end of the device to the other.

It is now common practice for produce packers to reduce the temperature of fruits and vegetables as soon after the same have been received as is practical. The purpose of cooling such fruits and vegetables is to preserve the flavor, retard ripening, and perhaps reduce enzymatic discoloration. While vegetables, such as potatoes, may be handled in a relatively rough manner without damaging the vegetable, such produce as tomatoes, peaches, pears and the like may be relatively soft and easily bruised and hence require relatively gentle handling. In plants of the type which usually process relatively large volumes of fruits and vegetables, it is extremely difficult to prevent damage to such soft vegetables and fruits. Therefore, there has been a long felt need for a machine which, while handling a high volume of fruits and vegetables for cooling, will do so in a sufficiently gentle manner that it will not materially damage the texture of these foods.

Briefly, in an effort to produce such a device, I have devised a machine which includes a frame structure defining a hollow trough through which a conveyor belt passes along an inclined plane. Water usually covers a substantial part of the conveyor to a level such that when the fruits and vegetables are fed into the machine, the water will retard the fall of the fruits and vegetables sufficiently to retard material damage to the food when it strikes the conveyor. The conveyor itself includes a main conveyor and side conveyors which gently urge the fruits and vegetables up the inclined plane and out of the device. Also incorporated with the device is a cooling chamber which is adapted to retain ice for the cooling of the water which is circulated by pumps from the trough to the upper part of the structure and thence sprayed, through openings, throughout the length of the conveyor, the water being deflected by baffles to produce a plurality of spaced sheets of water which are dispersed by screens arranged therebeneath so that the velocity of the water is reduced to a minimum before it is discharged onto the fruits and vegetables on the conveyor. The screens have an additional function of separating any large solid matter which may be carried by the water. The side conveyors of my mechanism are driven at substantially the same speed as the main conveyor and a mechanism is provided for synchronizing the side conveyors and the main conveyor and for taking up any slack resulting in the conveyors. Mechanism is also provided for retarding any lateral walk of the side conveyors with respect to the rollers over which they pass.

Accordingly, it is an object of the present invention to provide a cooling device for fruits and vegetables which is inexpensive to manufacture, durable in structure and efficient in operation.

Another object of the present invention is to provide a cooling device for cooling fruits and vegetables which will cool, to a relatively uniform temperature, a large quantity of fruits and vegetables in a relatively short period of time.

Another object of the present invention is to provide a cooling device for fruits and vegetables which will reduce the amount of fruit normally expected to be damaged in the cooling process.

Other objects, features and advantages of the present invention will become apparent from the following specification when taken in conjunction with the accompanying drawings, wherein like characters of reference designate corresponding parts throughout the several views and wherein:

FIG. 1 is a partially broken away side elevational view of a cooling device constructed in accordance with the present invention.

FIG. 2 is an enlarged fragmentary vertical sectional view of the infeed end of the cooling device illustrated in FIG. 1.

FIG. 3 is a cross sectional view taken along line 3—3 in FIG. 2.

FIG. 4 is an enlarged fragmentary side elevational view of the discharge end of the device illustrated in FIG. 1.

FIG. 5 is a diagrammatical plan view of the side belt take-up rollers of the device illustrated in FIG. 1.

FIG. 6 is an enlarged fragmentary plan view of the discharge end of the mechanism illustrated in FIG. 4.

Referring now in detail to the embodiment chosen for purpose of illustrating the present invention, it being understood that in its broader aspects the present invention is not limited to the mechanical details herein depicted, numeral 10 denotes the spaced parallel longitudinally extending base members of a support frame which are mounted on a suitable supporting structure, such as a floor (not shown). Mounted on the base member 10 are a plurality of spaced upstanding standards 11 which increase in length from the infeed end to the discharge end of the device. On top of the standards 11 are a pair of spaced longitudinally extending support joists 12. Reinforcing ribs 13 arranged adjacent standards 11 provide rigidity for the support frame thus described.

Mounted on the support joist 12 is the cooling trough denoted generally by numeral 14. The trough 14 includes a flat bottom 15 which is inclined upwardly toward the discharge end of the device and side members 16 which are coextensive with the bottom 15, being essentially triangular members disposed in spaced vertical planes so as to the provide upper edges which lie in essentially a horizontal plane. The ends of the trough 14 are closed by end members 17 and 18, respectively.

Projecting inwardly from the inner surface of the infeed end member 18 is a triangular shaped brace 19 which supports an inclined chute 20 for directing fruits and vegtables onto the conveyor mechanism hereinafter to be described. Mounted on the upper edges of the side member 16 is upstanding inverted U-shaped structure or canopy denoted generally by numeral 21, the end uprights 22 of which terminates inwardly of the trough 14 over which the canopy 21 is disposed. The canopy 21 includes a frame structure having spaced parallel base members 23 mounted on the upper edges of the side members 16. Equal spaced uprights 24 extend from intermediate positions on the base members 23 and support by their upper ends the head rails 25 and 26. It will be observed that the head rails 26 are below the head rails 25 since the canopy must be higher at the discharge end than at the infeed end, to maintain substantially the same height above bottom 15 throughout the mechanism. Suitable metal panels 27 are arranged between the adjacent uprights 22 and 24 and flat metal plates 28 and 29 extend across the head rails 25 and 26. Thus a covering is provided for substantially the entire trough 14.

Below the metal plates 28 and 29 are the cooling water accumulator tanks 30 and 31, the top and sides of which are formed by the inner surfaces of plates 28 and 29 and the upper portions of panels 27. Tanks 30 and 31 are respectively provided with perforated bottom plates 32 and 33 which are horizontally disposed below plates 25 and 26. As best seen in FIG. 2, the perforated bottom plate, such as bottom plate 33, includes a plurality of transversely and longitudinally aligned holes 34 through which the water is discharged from the tank into the trough 14. Each tank 30, 31 is closed by end plates, such as end plates 35, and separated from each other by partition 36. Suitable aprons, such as apron 37, are arranged below the end plates, such as end plate 35, to prevent splashing of the water from the device.

It will be seen in FIG. 1 that the bottom plate 32 is in a horizontal plane above bottom plate 33 since the trough 14 is on an incline.

Below the transversely aligned rows of apertures 34, respectively, are the baffles 38 which are arranged at about a 45° angle and extend transversely between the sides formed by the panels 27. Below the baffles 38 are a plurality of screen frames 39, arranged in end-to-end abutting fashion, the screen frames 39 being retained between opposed horizontally disposed angle irons 40 mounted on the inside of the canopy 21. Each frame 39 is provided with a screen, such as screen 40', so that water from the tanks 30 and 31 passes through the holes 34 onto the baffles 38 and through the screens, such as screen 40'.

Arranged along one side of the trough 14, intermediate the ends thereof, is a cooling tank denoted generally by numeral 41. The cooling tank 41 is approximately the same height as the trough 14 and is open at its top, being provided with sides 42 and 43, ends 44 and bottom 45. It will be observed in FIG. 1 that the sides 42, 43, 44 and bottom 45 are double wall members having an air space therein for insulating purposes. The cooling tank 41 is for retaining ice over which the water passes and is suitably supported by legs 46 and cross beam 47.

The tank 41 communicates with the trough 14 through an opening 48, over which is disposed a loosely woven wire mesh screen 49. When liquid is accumulated in the trough 14 to the height of the opening 48, the liquid will spill over into the cooling tank 41.

Arranged at opposite ends within the tank 41 are the suction duct supporting frames, such as frame 50, which support adjacent the bottom 45 of tank 41 the suction ducts, such as duct 51. The suction duct, such as duct 51, communicates with the pumps 52 and 53 which are, respectively, driven by electric motors 54 and 55, the discharge end of the pumps 52 and 53 communicating respectively with the accumulator tanks 30 and 31. Upon actuation of the pumps 52 and 53, water will be drawn from the tank 41 and discharged into the tanks 30 and 31.

Disposed in parallel relationship to the bottom 15 and extending substantially the entire length of the trough 14 is the main conveyor having a transversely disposed drive shaft 60 seen best in FIG. 4 supported on pillow blocks, such as pillow block 61, adjacent and above the discharge end member 17, the pillow blocks being mounted on a suitable end frame 62 extending from the uprights 22 around the upper discharge end of the trough 14. Inwardly of the pillow blocks, such as pillow block 61, the shaft 60 is provided with a pair of spaced sprockets, such as sprocket 63, and outwardly of one side of the trough, the shaft 60 is provided with a drive sprocket 64.

A pair of endless chains, such as chain 65, extends around the sprockets, such as sprocket 63, and passes immediately above and about parallel to the bottom 15 of trough 14, being passed around a pair of sprockets, such as sprocket 66, within the infeed of the trough 14. The sprockets, such as sprocket 66, are carried by the transversely extending shaft 67 supported at its ends by the lower ends of a pair of spaced levers 68 which are pivotally mounted intermediate their ends by pivot pins, such as pivot pins 69, secured to the inside surfaces of side members 16 of trough 14. The upper ends of levers 68 are provided with pivotally mounted clevises 70 each of which carries an adjustment bolt, such as bolt 71. The adjustment bolts, such as bolt 71, project through flange bars 72, respectively arranged at the junction of the side members 16 and the uprights 22 at the infeed end of the trough 14. Adjustment nuts, such as nut 73, are threadedly received on the bolts, such as bolt 71, whereby the position of the bolts may be varied to vary the angular position of the levers 68 and thus move the ends of shaft 67 forwardly or rearwardly.

Extending transversely across the chains, such as chain 65, and carried thereby are a plurality of wooden slats 74 which forms a moving platform of the main conveyor, the slats 74 being closely adjacent each other along the upper and lower flights of the main conveyor. For preventing sagging of the transverse slats 74 of the main conveyor, there are provided for the upper flight of chains, such as chain 65, slide bars, such as bar 75, which are about parallel to bottom 15 and terminate inwardly of the sprockets 63 and 66. Slide bar 75 is supported by ribs 76 which extend between the side members 16.

As best seen in FIG. 2, the lower end of the upper flight of the main conveyor terminates immediately below the chute 20 and hence those fruits and vegetables which are fed into the device will fall onto the slats 74 of the main conveyor and will be fed inwardly and upwardly thereby. It will also be understood that normally the opening 48, seen in FIG. 1, is in a horizontal plane above the lower end of the upper flight of the main conveyor and hence water will collect in the trough 14 to a position above this lower end. Thus the fruits and vegetables fed into the cooling device will pass downwardly through the water before striking the upper flight of the main conveyor and hence the velocity of the fruits and vegetables will be retarded.

About aligned longitudinally with the levers 68 are a pair of brackets 77 which project inwardly from the inside surface of the infeed end member 18 below the chute 20. Opposed brackets 78 project inwardly from the side members 16 adjacent the upper edges thereof, the brackets 77 and 78 journaling adjacent opposite sides 16, respectively, the pair of idler shafts 79 carrying idler rollers 80. The idler shafts 79 are arranged about normal to the upper flight of the main conveyor and limited adjustment of the idler shafts 79 may be had by means of adjustment bolts, such as bolt 81, seen in FIG. 2, which is adapted to move the bearing of shaft 79 on the bracket 78.

Around the rollers 80 pass the endless side belts 82 and 83 of the secondary conveyor, the side belts 82, 83 extending adjacent the sides 16 in spaced parallel relationship throughout substantially the length of the trough 14. The lower edges of the inner flights of the side belts 82 and 83 terminate, respectively, adjacent and slightly below the opposite edges of the upper flight of the main conveyor, forming moving side conveyors or secondary conveyors which prevent any of the fruits and vegetables from being inadvertently dropped off of the sides of the main conveyor.

In FIGS. 4, 5 and 6, the mechanism for driving the conveyors, for increasing and decreasing the speed of drive of the conveyors and for taking up the slack in the side conveyors is illustrated. This mechanism includes the drive mechanism supporting structure denoted generally by numeral 90 which is mounted above the discharge end of trough 14. In more detail, the structure 90 includes a pair of U-shaped frames mounted about parallel to the main conveyor, one above the other and extending from the discharge end of uprights 22 of canopy 21. The lower frame includes a pair of angle irons 91 and 92 which extends outwardly and upwardly, about parallel to the upper flight of the main conveyor, beyond the sprockets, such as sprockets 63. The upper frame includes a pair of angle irons 93 and 94 which extends parallel to and above the angle irons 91 and 92, the inner ends of the angle irons 91, 92, 93 and 94 being secured to the uprights 22. The outer ends of the angle irons 91 and 93 are joined by a vertical strap 95, the lower end of which bends around the end of angle iron 91 and is secured to end frame 62, as seen in FIG. 4. A similar strap (not shown) joins the ends of angle irons 92 and 94. Extending horizontally across the outer ends of upper angle irons 93 and 94 is an end bar 96, while inwardly thereof there are provided motor supporting straps 97 and 98 which are parallel to the end bar 96. The ends of the motor supporting straps 97 and 98 are joined by a cross bar 99 at one end and a cross bar 100 at the other. Longitudinally extending reinforcing ribs 101, 102, 103 and 104 join intermediate portions of the motor supporting straps 97 and 98. On the motor supporting straps 97 and 98 is a motor platform 105 on which is disposed the motor 106. A set screw 107 projects through the end strap 100 and threadedly engages the platform 105 for moving the motor 106 transversely of the machine and longitudinally of the motor supporting straps 97 and 98.

The shaft of motor 106 is provided with a variable diameter pulley 108 around which extends a belt 109 which drives a pulley 110 connected to the input shaft of a gear reduction box 111 which has an output shaft 112 projecting from opposite sides of the gear box 111. One end of the shaft 112 is connected through a flexible coupling 113 to a power transfer shaft 114. Power transfer shaft 114 is supported by a pair of aligned bearings 115 and 116 mounted on rib 101 and cross bar 99, respectively. The end of shaft 114 is provided with sprocket 117, around which extends a chain 118, the chain 118 extending also around drive sprocket 64 on the end of drive shaft 60.

The other end of shaft 112 is provided with a sprocket 120 which drives a continuous chain 121 extending around a sprocket 122 on a secondary conveyor power transfer shaft 123. The secondary conveyor power transfer shaft 123 leads to a gear box 124 mounted centrally between end bar 96 and motor supporting strap 97. Leading from the gear box 124 is a shaft 125 which drives a gear 126, meshing with a gear 127 on the upper end of a vertical shaft 128 journaled by bearing 129 mounted on gear box 124. The lower end of shaft 128 is provided with a pair of sprockets (not shown) which drives, respectively, endless chains 130 and 131. The endless chains 130 and 131 extend transversely in opposite directions and respectively extend around sprockets 132 and 133 on the upstanding drive shafts 134 and 135 of the complementary side belt drive rollers 136 and 137. Thus it is seen that the drive shafts 60, 134 and 135 are driven in synchronization with each other, the speed being variable by the variable speed pulley 108. The drive shaft 135 is supported by a pair of bearings 140 and 141 mounted respectively on angle irons 93 and 91 so that the shaft is customarily normal to the side belt 82. As best seen in FIG. 4, the bearings 140 and 141 are slidable within slots along the angle irons 91 and 93, the position of the bearings being variable by adjustment bolts 142 and 143 which project rearwardly through strap 95. Similar bearings, such as bearing 144, adjustable by adjustment bolts, such as bolt 145, retain the shaft 134. In front of the drive rollers 136 and 137 are the idler rollers 146 and 147 which are, respectively, carried by shafts 148 and 149 between the brackets 91, 93 and 92, 94, respectively. The upper ends of shafts 148 and 149 are tiltable within a slot in the angle irons 93 and 94 by adjustment bolts 150 and 151 which extend rearwardly through the straps, such as strap 95.

In front and outwardly of the rollers 146, 147 are the idler rollers mounted on shafts 154 and 155 and one of which is indicated by 153 in FIGURE 5. The shaft 155 is carried between bearings 156 and 157 mounted respectively on angle irons 91 and 93. The bearings 156 and 157 are slidable within slots in their respective angle irons 91 and 93 and the rearward movement of the idler roller 153 is resisted by the adjustment bolts 158 and 159 projecting through appropriate flanges in the upright 22 adjacent thereto. The bolts 158 and 159 threadedly receive nuts 160 and 161 for adjusting the position of the bearings 156 and 157 respectively. The shaft 154 is provided with similar bearings, such as bearing 162 and a similar adjustment bolt, such as bolt 163. The inner races of side belts 82 and 83 are respectively fed around the drive rollers 137 and 136, leading next to the idler rollers 153 and then to the idler rollers 146, 147. For example, in FIG. 5 the side belt 82 leads around the rear portion of the drive roller 137 and thence around the forward portion of the idler roller 153 and thereafter around the rearward portion of the idler roller 147. Thus, the drive roller 137 and the idler roller 147 are urged forwardly by the belt 182 while the idler roller 153 is urged rearwardly thereby. By the tightening of the nuts or adjustment bolts 142 and 143, the drive roller 137 may be urged rearwardly and its tilt varied slightly as desired. By the tightening of adjustment bolt 151, the idler roller 147 may be tilted rearwardly, and by the tightening of nuts 160 and 161, the idler roller 153 may be urged forwardly. It is therefore seen that by the adjustment of adjustment bolt 151, the roller 147 may be tilted slightly in one direction or the other and hence the belt will be caused to track one way or the other while the adjustment of the positions of the rollers 137 and 153 will tighten or loosen the belt as desired.

*Operation*

From the foregoing description the operation of the present device should be apparent. When the device is to be used, ice is placed in the cooling tank 41 and sufficient water is fed into the trough 14 to spill over through the opening 48 into the tank 41. The motors 54 and 55 are started and hence pump the water up into the tanks 30 and 31 until these tanks are substantially filled as the water is added to trough 14. Thereafter, motor 106 is started which drives simultaneously through the gearing arrangement heretofore described the rollers 136 and 137, while at the same time driving the shaft 160 to drive the sprockets, such as sprocket 63. Thus, the upper flight of the main conveyor 59 moves upwardly in the trough and the inner flights of the side conveyors or belts 82, 83 move upwardly in the trough at substantially the same rate. Articles, such as fruits and vegetables, are fed down chute 20 and lead continuously on the slats 74 of the main conveyor whence they are carried inwardly and upwardly in the trough 14. The water in the tanks 30 and 31 passes through perforated bottom plates 32 and 33 and thence onto the baffles, such as baffles 38, and then through the screen, such as screen 40'. From the screens, such as screen 40', the water falls into the trough, thereby continuously washing the articles of fruits and vegetables which are carried on the slats 74. Usually, the level of the water in the trough 14 is above the upper flight of the main conveyor at the lower portion of the trough 14 but is below the upper flight of the conveyor as it approaches the discharge end of the device. Thus, it is seen that the fruits and vegetables are first completely immersed in water and agitated slightly by the upward and rearward movement of the slats which carry them through the device. As the slats 74 approach the rearward end of the device, the fruits and vegetables are removed from the immersion in water and thereafter sprinkled from above by the continuous flow of water from the tanks, particularly tank 30. As the fruits and vegetables approach the discharge end of the device, the slats 74 pass around the sprockets, such as sprocket 63, and hence the fruits and vegetables are discharged into any suitable receptacle arranged therebeneath.

In the event that relatively tough fruits and vegetables are to be washed in the present device, it may be found advantageous to lower the water level by lowering the position of the opening 48. Under such conditions, the trough will not be filled with water above the upper flight of the main conveyor and hence throughout the entire device the fruits and vegetables will be sprinkled with water from the tanks 30 and 31.

It will be obvious to those skilled in the art that many variations may be made in the embodiment here chosen for the purpose of illustrating the present invention and that full resort may be had to equivalents without departing from the scope of the present invention as defined by the appended claims.

I claim.

1. A cooling device for cooling fruits and vegetables comprising a support frame having a trough on said support frame including a bottom and sides, said bottom being inclined therewith to define a lower inlet end and an upper discharge end, a canopy over the central portion of said trough, a pair of accumulator tanks disposed in said canopy and over said trough, said tanks each having a bottom plate at about the same mean height over said bottom and with a plurality of holes therethrough, a cooling tank arranged adjacent said trough in side-by-side relationship thereto, individual pump means for pumping water from said cooling tank into each of said accumulator tanks, said cooling tank communicating with said trough above said bottom whereby water above a predetermined level in said trough is directed into said cooling tank, and conveyor means within said trough inclined upwardly and rearwardly of said trough about parallel to said bottom, the forward portion of said conveyor means being below said water level in said tank so that fruits and vegetables fed into the inlet end of said trough will pass by gravity through said water and be received on said forward portion of said conveyor, the water through which said fruits and vegetables pass being of sufficient depth to retard the downward travel of said fruits and vegetables before they reach said conveyor.

2. A cooling device for cooling fruits and vegetables comprising a support frame, a trough on said support frame including a bottom and sides, a canopy over said trough, an accumulator tank disposed in said canopy and over said trough, said tank having a bottom plate with a plurality of holes therethrough, pump means for pumping water from said trough into said accumulator tank whereby water from said trough is circulated from said trough to said tank and thence down into said trough, a main conveyor within said trough uniformly inclined upwardly and rearwardly of said trough, means for directing said fruits and vegetables onto the lower portion of said conveyor, and secondary conveyors arranged about normal to and on opposite sides of said main conveyor in said trough, the edges of said main conveyor terminating adjacent the surfaces of said secondary conveyors, said main conveyor and said secondary conveyors cooperating together to move said fruits and vegetables through said trough and up said incline, said fruits and vegetables being discharged at the upper end of said main conveyor.

3. A cooling device for cooling fruits and vegetables comprising a trough having a bottom and sides and ends, said bottom being supported at an incline, said trough having an inlet end and a discharge end, a canopy over the central portion of said trough, an accumulator tank disposed in said canopy and over said trough, means for delivering water from said tank over said trough, a cooling tank arranged adjacent said trough in side-by-side relationship thereto, pump means for pumping water from said cooling tank into said accumulator tank, said cooling tank communicating with said trough whereby water from said trough is directed into said cooling tank, a main conveyor within said trough inclined upwardly and rearwardly of said trough, the forward portion of said conveyor means being below said water level in said tank so that fruits and vegetables fed into the inlet end of said trough will pass by gravity through said water and be received on said forward portion of said conveyor, the water through which said fruits and vegetables pass being of sufficient depth to retard the downward travel of said fruits and vegetables before they reach said conveyor, means for directing said fruits and vegetables onto the lower portion of said conveyor, and power means for driving said main conveyor, said main conveyor including transversely disposed slats for carrying said fruits and vegetables.

4. A cooling device for cooling fruits and vegetables comprising a support frame having a pair of spaced longitudinal support joists extending upwardly and rearwardly to define an incline, a trough on said support frame including a bottom and sides, said bottom being supported by said joists and inclined therewith, a canopy over said trough, an accumulator tank disposed in said canopy and over said trough, said tank having a bottom with a plurality of holes through said bottom, a cooling tank arranged adjacent said trough, pump means for pumping water from said cooling tank into said accumulator tank, said cooling tank communicating with said trough whereby water from said trough is directed into said cooling tank, a main conveyor within said trough uniformly inclined upwardly and rearwardly of said trough, means for directing said fruits and vegetables onto the lower portion of said conveyor, secondary conveyors arranged on opposite sides of said main conveyor in said trough, the edges of said main conveyor terminating adjacent the surfaces of said secondary conveyor, and power means for driving said main conveyor and said secondary conveyors simultaneously with each other, said secondary conveyor including conveyor belts passing adjacent said main conveyor, said main conveyor including transversely disposed slats for carrying said fruits and vegetables.

5. A cooling device for cooling fruits and vegetables comprising a support frame having a pair of spaced longitudinal support joists extending upwardly and rearwardly to define an incline, a trough on said support frame including a bottom and sides, said bottom being supported by said joists and inclined therewith to define a lower inlet end and an upper discharge end, a canopy over said trough, a pair of accumulator tanks disposed at different levels in said canopy and at about the same mean height over said trough, said tanks each having a bottom plate with a plurality of holes therethrough, a cooling tank arranged adjacent said trough in side-by-side relationship thereto, pump means for pumping water from said cooling tank into said accumulator tanks, said cooling tank communicating with said trough above said bottom whereby water from said trough is directed into said cooling tank after the water in said trough reaches a predetermined level therein, a main conveyor within said trough inclined upwardly and rearwardly of said trough, the lower portion of the upper flight of said conveyor being below said level of said water, and means for directing said fruits and vegetables onto said lower portion of said conveyor through said water.

6. A cooling device for cooling fruits and vegetables comprising a support frame, a trough for retaining water on said support frame having a bottom inclined upwardly and rearwardly, a canopy over said trough, an accumulator tank for water disposed in said canopy and over said trough, said tank having a bottom plate with a plurality of holes through which water in said tank flows, baffles below said tank and carried by said canopy for deflecting said water, a screen below said baffles for collecting foreign matter entrained in the water passing from said baffles, a cooling tank arranged adjacent said trough for cooling said water, pump means for pumping said water from said cooling tank into said accumulator tank, said cooling tank communicating with said trough whereby said water above a predetermined level in said trough is directed into said cooling tank, a main conveyor within said trough uniformly inclined upwardly and rearwardly of said trough, the lower portion of said conveyor being below the water level in said trough, means for directing said fruits and vegetables onto said lower portion of said conveyor, secondary conveyors arranged on opposite sides of said main conveyor in said trough, the edges of said main conveyor terminating adjacent the surfaces of said secondary conveyor, and power means for driving said main conveyor and said secondary conveyors simultaneously in synchronization with each other, said secondary conveyor including conveyor belts passing adjacent said main conveyor.

7. A cooling device for cooling fruits and vegetables comprising a support frame having a pair of spaced longitudinal support joists extending upwardly and rearwardly to define an incline, a trough on said support frame including a bottom and sides, said bottom being supported by said joists and inclined therewith, a canopy over said trough, an accumulator tank disposed in said canopy and over said trough, said tank having a bottom with a plurality of holes through said bottom, a cooling tank arranged adjacent said trough, pump means for pumping water from said cooling tank into said accumulator tank, said cooling tank communicating with said trough whereby water from said trough is directed into said cooling tank, a main conveyor within said trough inclined upwardly and rearwardly of said trough, means for directing said fruits and vegetables onto the lower portion of said conveyor, secondary conveyors arranged on opposite sides of said main conveyor in said trough, power means for driving said main conveyor and said secondary conveyors simultaneously in synchronization with each other, said secondary conveyor including conveyor belts passing adjacent said main conveyor, drive rollers driven by said power means and around which said belts pass, idler rollers adjacent said drive rollers and around which said belts pass, means for varying the position of said idler rollers with respect to said drive rollers, and means for tilting certain of the aforesaid rollers for varying the tracking of said belts, said main conveyor including transversely disposed slats for carrying said fruits and vegetables.

8. A cooling device for cooling fruits and vegetables comprising a support frame having a pair of spaced longitudinal support joists extending upwardly and rearwardly to define an incline, a trough on said support frame including a bottom and sides, said bottom being supported by said joists and inclined therewith to define a lower inlet end and an upper discharge end, a canopy over said trough, a pair of longitudinally arranged accumulator tanks disposed at different levels in said canopy and over said trough, said tanks each having a bottom plate with a plurality of holes therethrough, the bottom plate of the tank near said discharge end being above the bottom plate of the tank near said inlet end, a cooling tank arranged adjacent said trough, individual pump means for pumping water from said cooling tank into each of said accumulator tanks, said cooling tank communicating with said trough above said bottom whereby water from said trough is directed into small cooling tank after the water is in said trough reaches a predetermined level therein, a main conveyor within said trough inclined upwardly and rearwardly of said trough about parallel to said bottom, the lower portion of the upper flight of said conveyor being below said level of said water, means for directing said fruits and vegetables onto said lower portion of the upper flight of said conveyor through said water, secondary conveyors arranged on opposite sides of said main conveyor in said trough, power means at the discharge end of said trough for driving said main conveyor and said secondary conveyors simultaneously in synchronization with each other, said main conveyor including transversely disposed wooden slats adjacent each other, said secondary conveyor including conveyor belts passing adjacent the ends of said slats, drive rollers driven by said power means and around which said belts pass, idler rollers adjacent said drive rollers and around which said belts pass, means for varying the position of said idler rollers with respect to said drive rollers, and means for tilting certain of the aforesaid rollers for varying the tracking of said belts.

9. A cooling device for cooling fruits and vegetables comprising a support frame having a pair of spaced longitudinal support joists extending upwardly and rearwardly to define an incline, a trough on said support frame including a bottom and sides, said bottom being supported by said joists and inclined therewith to define a lower inlet end and an upper discharge end, a canopy over said trough, a pair of accumulator tanks disposed at different levels in said canopy and over said trough, said tanks each having a bottom plate with a plurality of holes therethrough, baffles below said holes for deflecting water falling by gravity from said tanks, a cooling tank arranged adjacent said trough, individual pump means for pumping water from said cooling tank into each of said accumulator tanks, said cooling tank communicating with said trough above said bottom whereby water from said trough is directed into said cooling tank after the water in said trough reaches a predetermined level therein, a main conveyor within said trough inclined upwardly and rearwardly of said trough about parallel to said bottom, the lower portion of the upper flight of said conveyor being below said level of said water, means for directing said fruits and vegetables onto said lower portion of the upper flight of said conveyor through said water, secondary conveyors arranged on opposite sides of said main conveyor in said trough, power means at the discharge end of said trough for driving said main conveyor and said secondary conveyors simultaneously in synchronization with each other, said main conveyor including transversely disposed wooden slats adjacent each other, said secondary conveyor including conveyor belts passing adjacent the ends of said slats, drive rollers carried by said trough and driven by said power means and around which said belts pass, idler rollers carried by said trough adjacent said drive rollers and around which said belts pass, means for varying the position of said idler rollers with respect to said drive rollers, and means for lifting certain of the aforesaid rollers for varying the tracking of said belts.

References Cited in the file of this patent
UNITED STATES PATENTS

| | | |
|---|---|---|
| 1,708,253 | Bell et al. | Apr. 9, 1929 |
| 1,999,817 | Martin | Apr. 30, 1935 |
| 2,050,964 | Dean et al. | Aug. 11, 1936 |
| 2,179,868 | Stebler | Nov. 14, 1939 |
| 2,182,927 | Matthews | Dec. 12, 1939 |
| 2,421,515 | McNamara et al. | June 3, 1947 |
| 2,545,299 | Moule | Mar. 13, 1951 |
| 2,554,560 | Craig | May 29, 1951 |
| 2,635,614 | Ford | Apr. 21, 1953 |
| 2,696,900 | Finstead | Dec. 14, 1954 |
| 2,806,578 | Jones et al. | Sept. 17, 1957 |